United States Patent [19]

Lederman

[11] Patent Number: 5,207,436
[45] Date of Patent: May 4, 1993

[54] LOW FRICTION UNITIZED SEAL

[75] Inventor: Frederick E. Lederman, Sandusky, Ohio

[73] Assignee: General Motors Corporation, Detroit, Mich.

[21] Appl. No.: 912,381

[22] Filed: Jul. 13, 1992

[51] Int. Cl.[5] .............................................. F16J 15/32
[52] U.S. Cl. ...................................... 277/38; 277/35; 277/96.2; 277/152; 384/147; 384/484
[58] Field of Search .................. 277/35, 38, 39, 40, 277/96, 96.1, 96.2, 152; 384/482, 484, 485, 486, 140, 147

[56] References Cited

U.S. PATENT DOCUMENTS

| | | | |
|---|---|---|---|
| 3,099,454 | 7/1963 | Walinski | 277/152 |
| 3,101,954 | 8/1963 | Huddle | 277/39 |
| 4,185,838 | 1/1980 | Danner | 277/58 |
| 4,497,495 | 2/1985 | Christiansen | 277/50 |
| 4,516,783 | 5/1985 | Mitsue et al. | 384/486 |
| 4,572,516 | 2/1986 | Symons et al. | 277/50 |
| 4,792,242 | 12/1988 | Colanzi et al. | 384/482 |
| 4,958,942 | 9/1990 | Shimizu | 384/486 |
| 5,024,364 | 6/1991 | Nash | 277/35 |
| 5,024,449 | 6/1991 | Otto | 384/486 |
| 5,121,999 | 6/1992 | Johnson et al. | 384/482 |

Primary Examiner—William A. Cuchlinski, Jr.
Assistant Examiner—Daniel G. Depumpo
Attorney, Agent, or Firm—Patrick M. Griffin

[57] ABSTRACT

A unitized seal incorporates two nested steel casing, a PTFE disk with two edges in sealing contact with one casing, and an elastomer seal with two lips in sealing contact with the back of the PTFE disk. The PTFE disk provides two primary, low friction sealing barriers. The elastomer seal provides two additional barriers, which comply more readily than the edges of the stiffer PTFE disk to radial eccentricity and axial run out. The elastomer seal lips run with reduced friction because of the fact that they contact the PTFE disk.

2 Claims, 3 Drawing Sheets

LOW FRICTION UNITIZED SEAL

This invention relates to unitized seals in general, and specifically to a unitized seal with multiple, low friction lines of sealing contact.

BACKGROUND OF THE INVENTION

Unitized seals include a pair of stamped metal casings nested together into a unit that can be press fitted into the annular space between a pair of relatively rotatable members, such as bearing races. Internal seals of various types are contained within the space between the nested casings, which may be molded elastomer, usually rubber, or harder, lower friction materials, such as PTFE. Examples may be seen U.S. Pat. No. 5,024,364 to Nash, and in coassigned U.S. Pat. No. 4,497,495 to Christiansen. Typically, the seal runs on a surface of the metal casing, since a rigid, unyielding material, such as metal, is more compatible with a softer material, such as rubber. Still, seals that involve rubber riding on rubber are known, such as that disclosed in U.S. Pat. No. 4,185,838 to Danner.

Two problems that all seals face are seal rubbing friction or torque, especially as additional lines of sealing contact are added, and the rapid fluctuations in the relative locations of the rotatable members that occur in operation, which inevitably causes the relative location of the seals and the surfaces that they run on to fluctuate. Seal friction can be reduced by using lower friction seal materials, such as PTFE disks, instead of rubber. However, PTFE, being a semi-rigid plastic, is less able to rapidly comply fluctuations in its running surface than an elastomer like rubber would be. Rubber, although compliant, is tacky, and, when running on a metal surface, needs some wet lubrication from the bearing grease to reduce its rubbing friction.

SUMMARY OF THE INVENTION

The invention provides a unitized seal that combines the best effects of both PTFE and rubber seals, and which is able to use the PTFE in cooperation with rubber to actually reduce seal friction.

In the preferred embodiment disclosed, each of a pair of nested, stamped metal casings is press fit to one of a pair of bearing races, within an annular space between the races. A first casing is generally C-shaped in cross section, with a pair of radially spaced sealing walls joined by an annular web. The second casing mounts an annular PTFE disk, which is slightly wider than the radial spacing of the sealing walls. Therefore, when the casings are pushed axially together, the inner and outer edges of the disk tightly contact the inside of the sealing walls, and are flexed slightly in. When the casings are flush, the disk is axially spaced from the annular web. In that space is an elastomer seal, fixed to the first casing, with two flexible cantilevered lips, that are resiliently compressed against the flat central section of the PTFE disk.

In operation, four total lines of sealing contact are provided, two by the disk and two by the elastomer seal lips. The flexed edges of the PTFE disk give low friction sealing barriers, but do not respond as readily to the rapid fluctuations in the relative position of the casings that occur as the bearing runs. The elastomer seal lips, each of which backs up an edge of the disk, do respond rapidly to position fluctuations, so as to assure good sealing contact. While the elastomer seal lips are closed off from the bearing grease supply, they run on the normally unused central section of the PTFE disk, which provides the lubrication that grease wetting typically would. In addition, in the embodiment disclosed, the seal casings cooperate to provide shipping damage protection for the edges of the disk.

DESCRIPTION OF THE PREFERRED EMBODIMENT

These and other objects and features of the invention will appear from the following written description, and from the drawings, in which.

Figure 1:
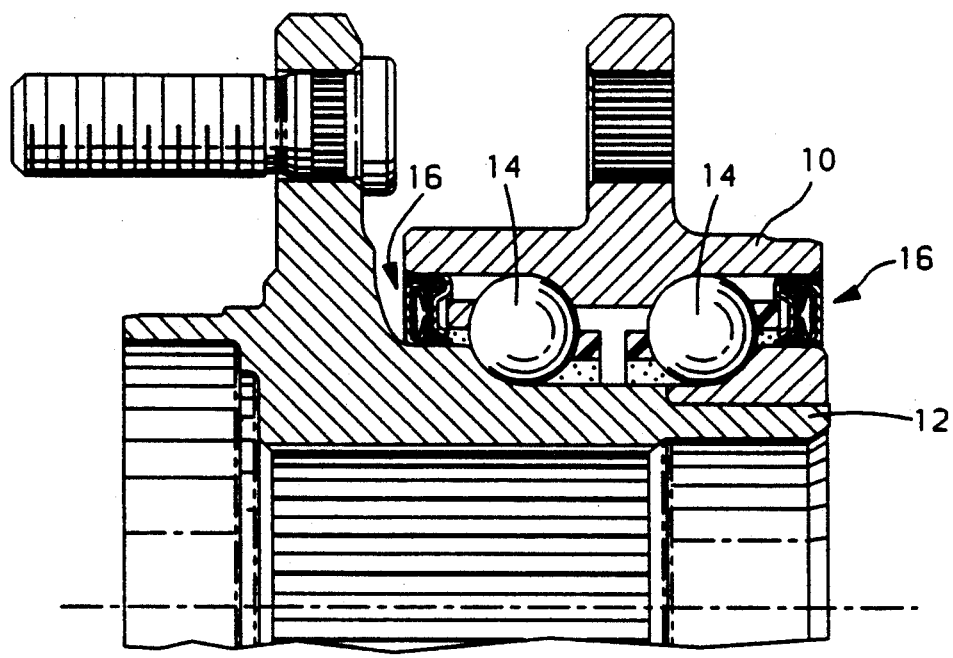
FIG. 1 is a cross section of one-half of a bearing incorporating two seals according to the invention.

Referring first to FIG. 1, a pair of relatively rotatable, coaxial members is illustrated, a stationary vehicle wheel bearing hub (10) and rotating spindle (12). Hub (10) and spindle (12) define an annular space between them, spaced apart by two rows of bearing balls (14). The balls (14), and their internal lubricant supply, are sealed by two unitized seals made according to the invention, indicated generally at (16), which are installed at the two ends of the annular space. Due to the high rotational speeds and the slight tolerances involved in size matching the balls (14), the hub (10) and spindle (12) run relative to one another with both a radial eccentricity and an axial play or run out. Seals (16) maintain multiple levels of low friction sealing in spite of the dynamic running forces at work.

Figure 2:
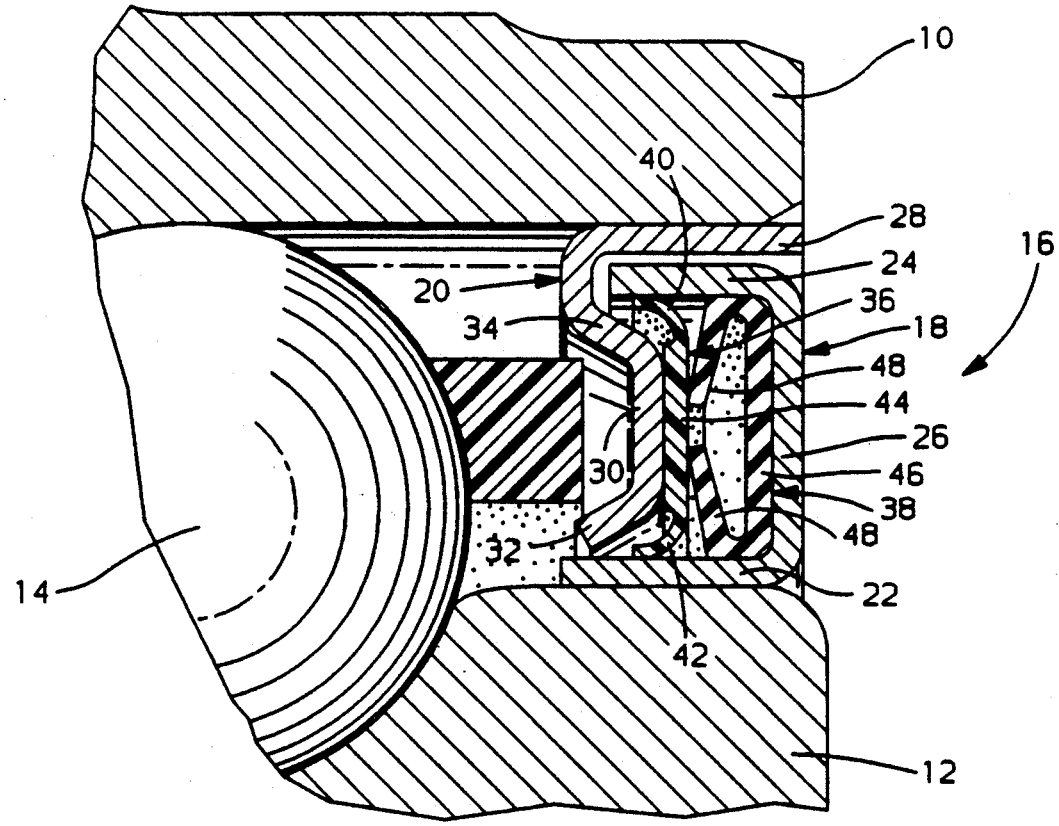
FIG. 2 is an enlargement of one seal.
Figure 3:
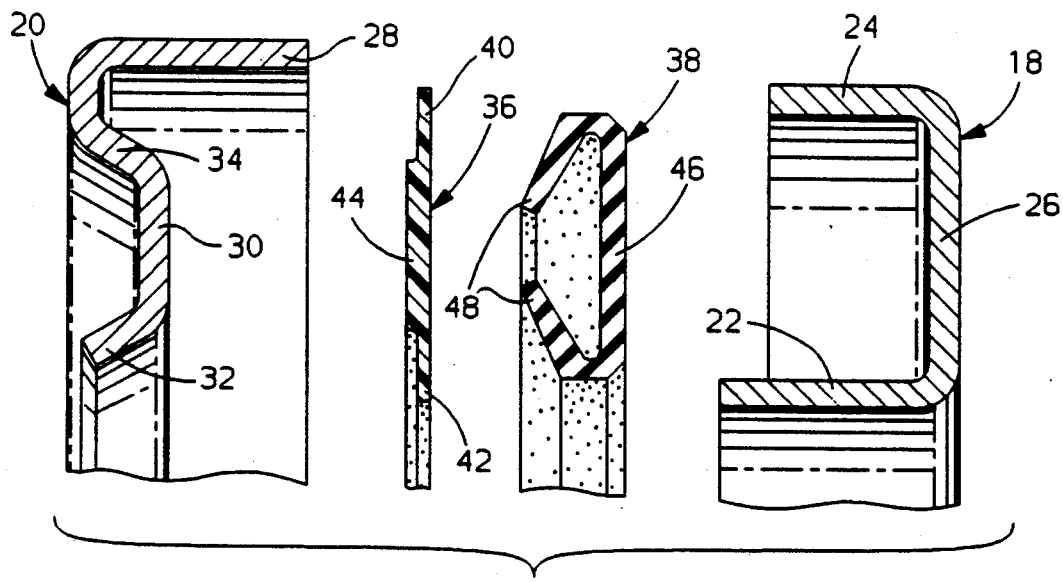
FIG. 3 is an exploded view of the four components of the seal.

Referring next to FIGS. 2 and 3, details of two of the four components of seal (16) are illustrated. Two stamped steel casings, a first, inner casing indicated generally at (18), and a second, outer casing indicated generally at (20), are designed to be nested axially together, and to fit between hub (10) and spindle (12). Inner casing (18) is generally channel or C-shaped in cross section, with a pair of inner and outer cylindrical sealing walls (22) and (24), joined by an annular web (26). The inner surfaces of the sealing walls (22) and (24) serve as seal running surfaces, while the outer surface of the inner sealing wall (22) press fits tightly over spindle (12). Outer casing (20) is generally L-shaped in cross section, with a cylindrical outer wall (28) that press fits tightly inside of hub (10). The rest of outer casing (20) would typically have a basic annular shape. Here, however, it is bulged axially inwardly into a flattened, annular boss (30), which is bordered on the inside by a flared rim (32) and on the outside by a sloped shoulder (34). Boss (30) is located at a diameter intermediate the diameters of the sealing walls (22) and (24). Therefore, as shown in FIG. 2, when the casings (18) and (20) are coaxial and axially flush, they are totally clear of one another, with the boss (30) radially between the sealing walls (22) and (24) and axially spaced from the annular web (26). In addition, flared rim (32) overlies the edge of inner sealing wall (22), and the edge of outer sealing wall (24) overlies the sloped shoulder (34), which serves a purpose described below.

Figure 4:
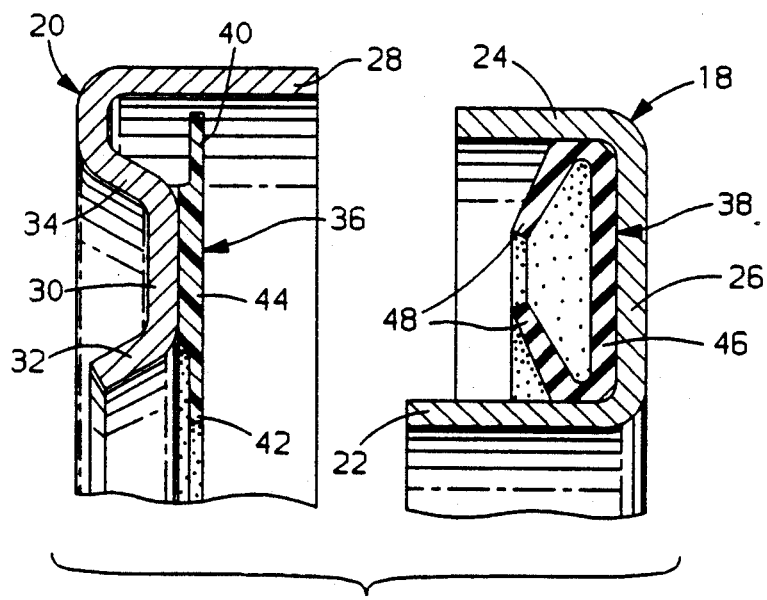
FIG. 4 is a view of the components partially assembled.

Referring next to FIGS. 3 and 4, the other two components are an annular disk of PTFE material, indicated generally at (36), and a molded rubber seal, indicated generally at (38). Disk 36 consists of a plastic material which, although low friction, is relatively stiff and inflexible as compared to rubber or other moldable elastomers. Therefore, its outer and inner edges (40) and (42) are thinned or feathered, leaving a thicker central section (44). Disk (36) is sized relative to the casings (18) and (20), with an edge-to-edge width slightly greater than the radial separation of the sealing walls (22) and (24), and with the width of the central section (44) being substantially equal to boss (30). This allows the disk central section (44) to be secured or bonded to boss (30) as shown to create one subassembly, coaxial to outer casing (20), with the edges (40) and (42) well clear of the rest of outer casing (20). Rubber seal (38) is generally triangular in cross section, with an annular web (46) that has a width substantially identical to the radial separation of the sealing walls (22) and (24). A pair of sloped seal lips (48) are cantilevered out from web (46), extending radially in and out toward one another. The inner diameter of rubber seal web (46) is just slightly less than inner sealing wall (22), so that seal (38) can be stretched tightly over it to create a second subassembly, as shown in FIG. 4, with the two webs (26) and (46) abutted.

Figure 5:
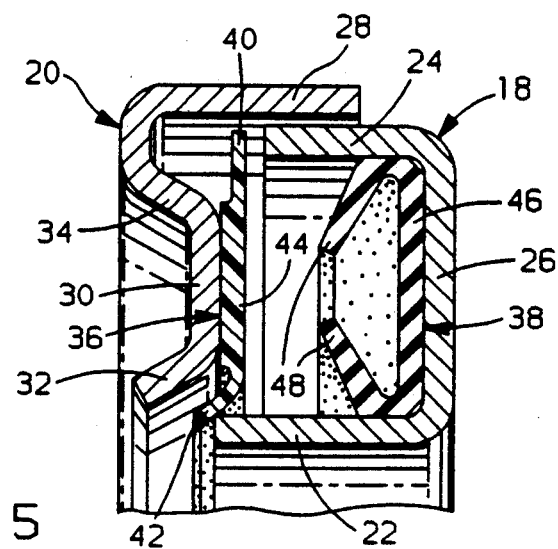
FIG. 5 shows the final assembly step.
Figure 6:
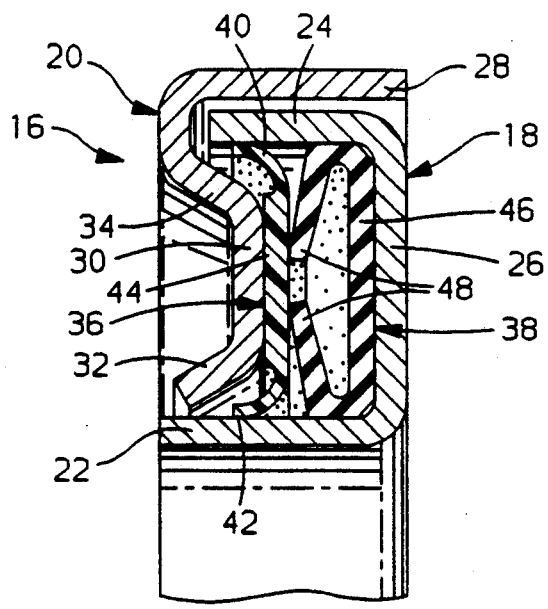
FIG. 6 shows the completed seal in a nominal position with the casings in a nominal, coaxial position.

Referring next to FIGS. 4 through 6, seal (16) is assembled simply by pushing the two subassemblies axially together until flush. As they move together, the the two disk edges (40) and (42) slide inside the sealing walls (22) and (24), and are bent and flexed in slightly. When the casings (18) and (20) are fully flush, the flat back surface of the disk central section (44) compresses the two elastomer seal lips (48). The disk edges (40) and (42) provide two lines of sealing contact that axially overlie the sloped shoulder (34) and flared rim (32) respectively, near their juncture with boss (30). These sealing contact lines, since they involve PTFE material rubbing on steel, are very low friction. The disk edges (40) and (42) are the initial barriers to both entry of outside contaminants or the loss of lubricant. Since the material of disk (36) is relatively stiff, however, even the thinned edges (40) and (42) are not flexible enough to comply with radial eccentricity and axial run out as rapidly as could be wished. This could lead to slight, temporary gaps between the edges (40), (42) and the sealing walls (24), (22). However, the elastomer sealing lips (48), each of which backs up a disk edge (40), (42), are more than flexible and resilient enough to comply. Given their orientation to the disk central section (44), which is normal to the rotational axis, the seal lips (48) are not affected by radial eccentricity, and they can easily maintain their sealing contact in spite of axial run out, assuring complete sealing contact. The seal lips (48) are remote from the bearing lubricant supply, which is on the other side of inner disk edge (42), so lubricant wetting cannot be looked to reduce their running friction. However, their running surface is provided not by part of a metal casing, but by the back surface of the disk central section (44), which would normally have no function but to support the edges (40), (42). Since PTFE is itself inherently dry lubricated, but harder than rubber, it provides a compatible running surface for the elastomer seal lips (48). Therefore, all of the four lines of sealing contact are low friction.

Figure 7:
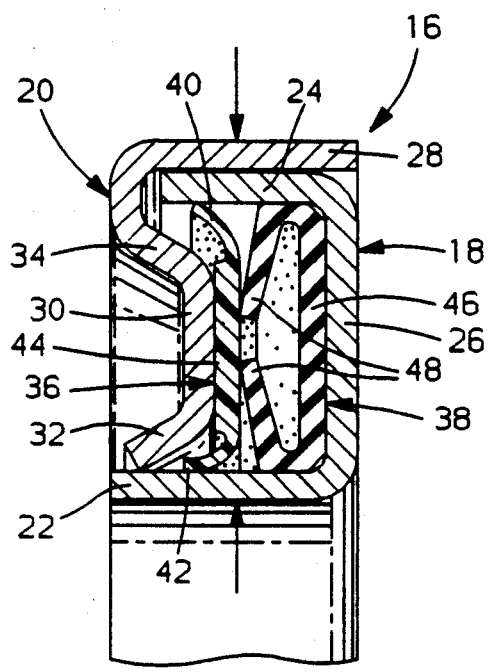
FIG. 7 shows the casings radially shifted in one direction.
Figure 8:
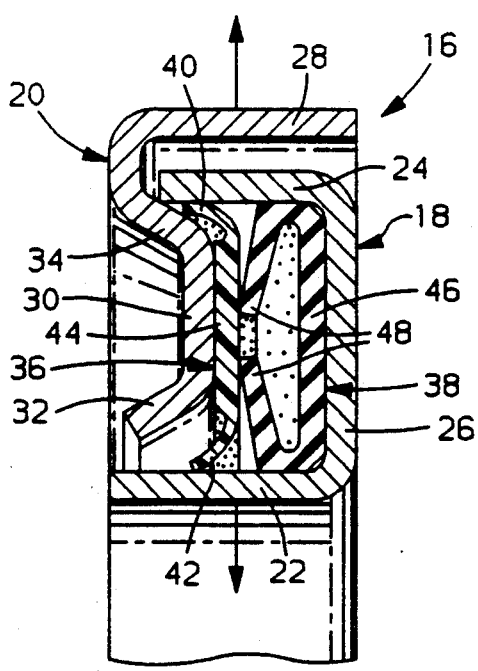
FIG. 8 shows the casings radially shifted in the other direction.

Referring next to FIGS. 7 and 8, an additional advantage of seal (16) is illustrated. The seal casings (18) and (20) are also subject to radial displacement during shipping. Being relatively stiff, the disk edges (40) and (42) are liable to shipping damage if they are over flexed. However, the outer disk edge (40) is located in the wider part of a wedge-shaped space formed between the sloped shoulder (34) and the outer sealing wall (24). Likewise, the inner disk edge (42) is located in the wider part of a wedge-shaped space formed between the flared rim (32) and the inner sealing wall (22). As shown in FIG. 7, if the casings (18) and (20) are squeezed radially together at some point, (the effect would be the opposite at the diametrically opposed point) then the flared rim (32) will contact inner sealing wall (22) before inner disk edge (42) is over flexed or pinched. As shown in FIG. 8, if the casings (18) and (20) are pulled radially apart, then the edge of outer sealing wall (24) will contact sloped shoulder (34), protecting disk outer edge (40) in similar fashion.

In conclusion, a particularly compact and effective sealing package is provided. The axial space between disk (36) and web (26), which would typically be empty, is used to contain an extra back up seal (38), and the disk (36) itself provides an extra function. Variations in the disclosed embodiment could be made. The casings could be made of any suitable rigid material, that is, a material that provides a hard running surface for the more compliant material of the disk (36). Other low friction plastic materials, embedded with graphite or other dry lubricants, could be used for disk (36). Such a material, like PTFE, would be stiffer and less compliant than elastomer, but this is a characteristic that works well in the invention, because of the multiple functions that the disk (36) provides. More or fewer seal lips like (48) could be used. The use of two seal lips (48) serves well to back up both edges of disk (36), however, and also creates a partially enclosed space in seal (38) that could be used to retain a packing of grease or the like for extra friction reduction. The portion of outer casing (20) to which disk (36) is fixed could be made differently, for example, a simple flaring of the edge would be sufficient to mount disk (36) clear of the rest of casing (20). However, the way the boss (30) is stamped provides a more stable support surface for disk (36), and also creates the flared rim (32) and sloped shoulder (34) that cooperate with the sealing walls (22) and (24) to protect the edges of disk (36). Therefore, it will be understood that it is not intended to limit the invention to just the embodiment disclosed.

The embodiments of the invention in which an exclusive property or privilege is claimed are defined as follows:

1. A unitized seal for installation in an annular space between a pair of relatively rotatable, generally coaxial members that are subject to dynamic running forces that rapidly vary the relative axial and radial positions thereof, said seal comprising, a first casing of rigid material joined to one of said rotatable members within said annular space and having a pair of radially spaced cylindrical sealing walls joined by an annular web, a second casing joined to the other of said rotatable members, an annular disk of relatively stiff, low friction plastic material having a flat central section and a radial width measured between inner and outer edges thereof that is slightly greater than the radial spacing of said sealing walls, said disk being secured to said first casing so as to be coaxial to said second casing and axially spaced from said annular web with said inner and outer edges contacting said sealing walls, thereby providing two low friction lines of sealing contact, and, a resilient elastomer seal joined to said second casing and located in the axial space between said annular disk and annular web, said elastomer seal having at least one flexible seal lip resiliently engaged with said disk central section, thereby providing an additional low friction sealing barrier that responds quickly to said dynamic forces to maintain sealing contact, whereby multiple low friction sealing barriers are created within said annular space, each involving contact of compatible sealing materials.

2. A unitized seal for installation in an annular space between an inner and outer, relatively rotatable, generally coaxial members that are subject to dynamic running forces that rapidly vary the relative axial and radial positions thereof, said seal comprising, an inner casing of rigid material adapted to be joined to said inner rotatable member within said annular space and having a pair of radially spaced cylindrical sealing walls joined by an annular web, an outer casing adapted to be joined to said outer rotatable member with an annular boss located at a diameter intermediate said sealing walls and bordered by a sloped shoulder on the outside and a flared rim on the inside, an annular disk of relatively stiff, low friction plastic material having a flat central section and a radial width measured between inner and outer edges thereof that is slightly greater than the radial spacing of said sealing walls, said disk central section being secured to said annular boss so as to be coaxial to said inner casing and axially spaced from said annular web with said inner and outer edges contacting said sealing walls and overlaying said flared rim and sloped shoulder respectively, thereby providing two low friction lines of sealing contact, and, a resilient elastomer seal joined to said second casing and located in the axial space between said annular disk and annular web, said elastomer seal having at least one flexible seal lip resiliently engaged with said disk central section, thereby providing an additional low friction sealing barrier that responds quickly to said dynamic forces to maintain sealing contact, whereby multiple low friction sealing barriers are created within said annular space, each involving contact of compatible sealing materials, with said disk inner and outer edges being protected, in the event of radial displacement of said casings, by contact of said inner casing sealing walls with said outer casing sloped shoulder and flared rim.

* * * * *